US012614204B2

(12) United States Patent
Gupta et al.

(10) Patent No.: US 12,614,204 B2
(45) Date of Patent: *Apr. 28, 2026

(54) USING A TRAINED MODEL FOR DISPLAYING ELEMENTS OF USER INTERFACE TO FACILITATE ENGAGEMENT BY A USER OF AN ONLINE SYSTEM WITH USER INTERFACE ELEMENTS

(71) Applicant: Maplebear Inc., San Francisco, CA (US)

(72) Inventors: Sanchit Gupta, Seattle, WA (US); Axel Mange, New York, NY (US)

(73) Assignee: Maplebear Inc., San Francisco, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/629,755

(22) Filed: Apr. 8, 2024

(65) Prior Publication Data

US 2025/0315859 A1     Oct. 9, 2025

(51) Int. Cl.
*G06Q 30/0207* (2023.01)
*G06F 9/451* (2018.01)
*G06Q 30/0202* (2023.01)

(52) U.S. Cl.
CPC ......... *G06Q 30/0239* (2013.01); *G06F 9/451* (2018.02); *G06Q 30/0202* (2013.01)

(58) Field of Classification Search
None
See application file for complete search history.

(56) References Cited

U.S. PATENT DOCUMENTS

| | | | | |
|---|---|---|---|---|
| 10,853,826 B2* | 12/2020 | Romagnolo | ....... | G06Q 30/0203 |
| 12,271,746 B1* | 4/2025 | Sardari | ................. | G06Q 20/10 |
| 2021/0382952 A1* | 12/2021 | Yates | ................. | G06Q 30/0254 |
| 2022/0295154 A1* | 9/2022 | Mo | ....................... | H04N 21/252 |
| 2022/0351252 A1* | 11/2022 | Gerber | ............... | G06Q 30/0205 |

OTHER PUBLICATIONS

B. Kanagal and S. Tata, "Recommendations for All: Solving Thousands of Recommendation Problems Daily," 2018 IEEE 34th International Conference on Data Engineering (ICDE), Paris, France, 2018, pp. 1404-1413, doi: 10.1109/ICDE.2018.00159. (Year: 2018).*

* cited by examiner

*Primary Examiner* — Chesiree A Walton
(74) *Attorney, Agent, or Firm* — Fenwick & West LLP

(57) ABSTRACT

A trained model of an online system is used to display elements of a user interface of a user's device in a manner that increases a likelihood of user's engagement. Upon receiving a request from the user for a page of user interface elements and retrieving a set of user interface elements, the online system applies the trained model to predict a likelihood of user's engagement with each user interface element in the set for each incentive amount of multiple incentive amounts. The online system identifies, based on the likelihood of user's engagement with each user interface element for each incentive amount, an optimal incentive amount for each user interface element. The online system ranks the set of user interface elements based on the likelihood of user's engagement for the optimal incentive amount and displays the set of user interface elements at the user interface according to the ranking.

20 Claims, 5 Drawing Sheets

Online Concierge System 140

Data Collection Module 200

Content Presentation Module 210

Order Management Module 220

Machine Learning Training Module 230

Data Store 240

Engagement Prediction Module 250

Metric Computation Module 260

Ranking Module 270

Pricing Module 280

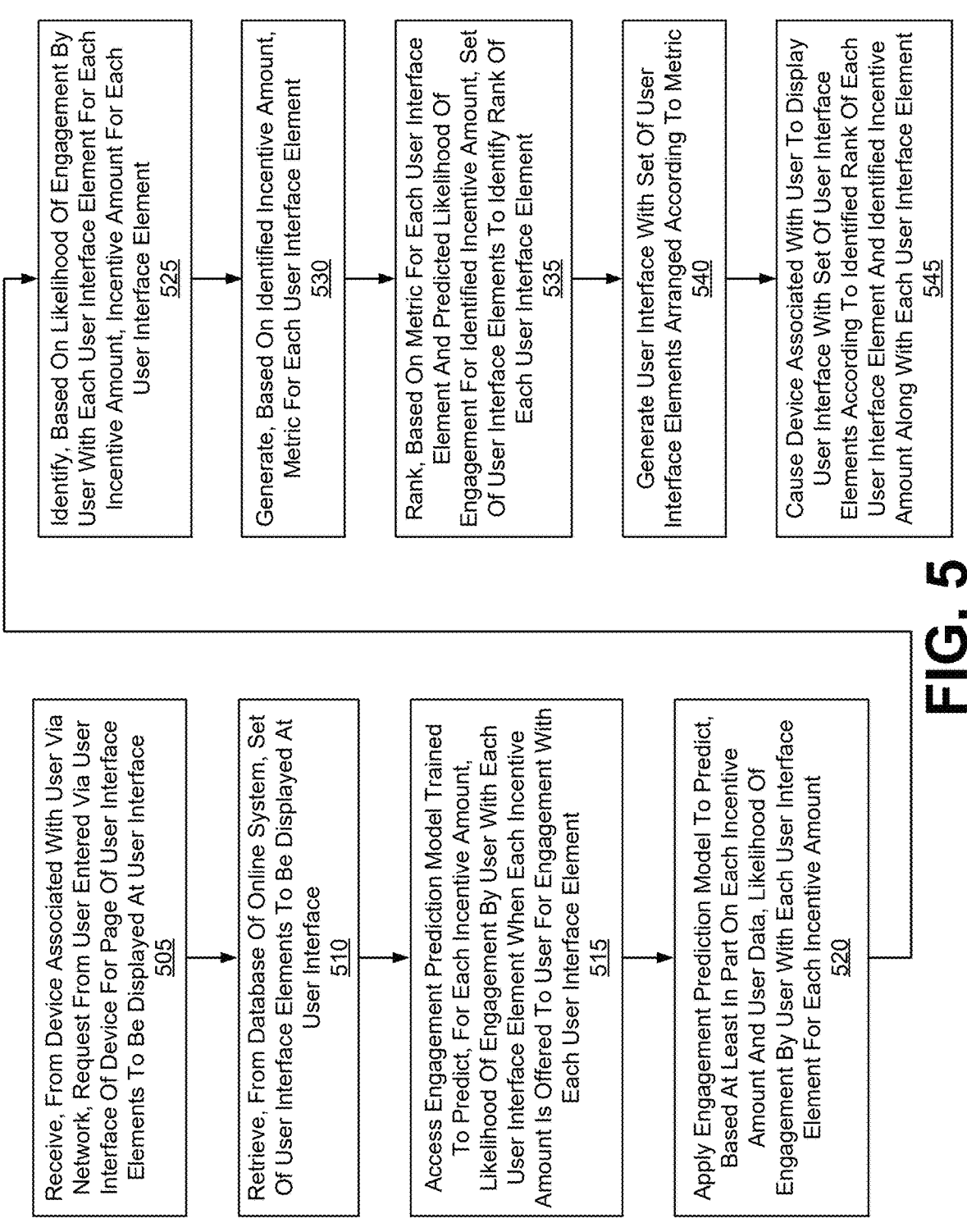

FIG. 5

Receive, From Device Associated With User Via Network, Request From User Entered Via User Interface Of Device For Page Of User Interface Elements To Be Displayed At User Interface
505

Retrieve, From Database Of Online System, Set Of User Interface Elements To Be Displayed At User Interface
510

Access Engagement Prediction Model Trained To Predict, For Each Incentive Amount, Likelihood Of Engagement By User With Each User Interface Element When Each Incentive Amount Is Offered To User For Engagement With Each User Interface Element
515

Apply Engagement Prediction Model To Predict, Based At Least In Part On Each Incentive Amount And User Data, Likelihood Of Engagement By User With Each User Interface Element For Each Incentive Amount
520

Identify, Based On Likelihood Of Engagement By User With Each User Interface Element For Each Incentive Amount, Incentive Amount For Each User Interface Element
525

Generate, Based On Identified Incentive Amount, Metric For Each User Interface Element
530

Rank, Based On Metric For Each User Interface Element And Predicted Likelihood Of Engagement For Identified Incentive Amount, Set Of User Interface Elements To Identify Rank Of Each User Interface Element
535

Generate User Interface With Set Of User Interface Elements Arranged According To Metric
540

Cause Device Associated With User To Display User Interface With Set Of User Interface Elements According To Identified Rank Of Each User Interface Element And Identified Incentive Amount Along With Each User Interface Element
545

USING A TRAINED MODEL FOR DISPLAYING ELEMENTS OF USER INTERFACE TO FACILITATE ENGAGEMENT BY A USER OF AN ONLINE SYSTEM WITH USER INTERFACE ELEMENTS

BACKGROUND

Online systems, such as online concierge systems, often face challenges of affordability perceptions among their users, as well as unutilized sponsored budgets especially in underpenetrated categories (e.g., households and/or personal care). Thus, it is desirable to encourage users of an online system to engage with specific content displayed at user interfaces of devices associated with the users. For example, the encouragement can involve offering discounted items sponsored by a third party (e.g., retailer associated with the online system) or otherwise providing various incentives for purchasing the sponsored items. But the incentives provided to users for encouraging their engagements with specific displayed content can be costly for the online system. Hence, it would be beneficial for the online system to have a way to determine an optical incentive for a specific content and how to display the specific content with the optimal incentive at the user interface in order to increase a likelihood of user's engagement with the displayed content and make it easier for the user to engage with the content displayed at the user interface.

However, there is a technical problem of how to automatically determine, for a specific user and at a large enough scale required by an online system, whether and how much to incentivize the user to engage with specific content displayed at a user interface of a device associated with the user, as well as how to display the specific content at the user interface to increase (and potentially maximize) the likelihood of user's engagement with the displayed content, while make it easier for the user to engage with the displayed content.

SUMMARY

Embodiments of the present disclosure are directed to using a trained model of an online system (e.g., online concierge system) to display elements of a user interface of a device associated with a user of the online system in a manner that makes it easier for the user to engage with the elements displayed at the user interface.

In accordance with one or more aspects of the disclosure, the online system receives, from a device associated with a user of the online system via a network, a request from the user entered via a user interface of the device for a page of user interface elements to be displayed at the user interface. Responsive to the received request, the online system retrieves, from a database of the online system, a set of user interface elements to be displayed at the user interface. The online system accesses an engagement prediction model of the online system, wherein the engagement prediction model is trained to predict, for each incentive amount of a plurality of incentive amounts, a likelihood of engagement by the user with each user interface element in the set of user interface elements when each incentive amount is offered to the user for engagement with each user interface element. The online system applies the engagement prediction model to predict, based at least in part on each incentive amount and user data associated with the user, the likelihood of engagement by the user with each user interface element for each incentive amount. The online system identifies, based at least in part on the likelihood of engagement by the user with each user interface element for each incentive amount, an incentive amount of the plurality of incentive amounts for each user interface element. The online system generates, based at least in part on the identified incentive amount, a metric for each user interface element, wherein the metric is indicative of the likelihood of engagement by the user with each user interface element for the identified incentive amount. The online system ranks, based on the metric for each user interface element and the predicted likelihood of engagement for the identified incentive amount, the set of user interface elements to identify a rank of each user interface element in the set of user interface elements. The online system generates, based on the ranking, the user interface that includes the set of user interface elements arranged according to the metric for each user interface element. The online system causes the device associated with the user to display the user interface with the set of user interface elements according to the identified rank of each user interface element, each user interface element displayed at the user interface along with the identified incentive amount.

BRIEF DESCRIPTION OF THE DRAWINGS

FIG. 5 is a flowchart for a method of using a trained model of an online concierge system to display elements of a user interface of a device associated with a user of the online concierge system in a manner that facilitates user's engagement with the user interface elements, in accordance with one or more embodiments.

DETAILED DESCRIPTION

Figure 1:
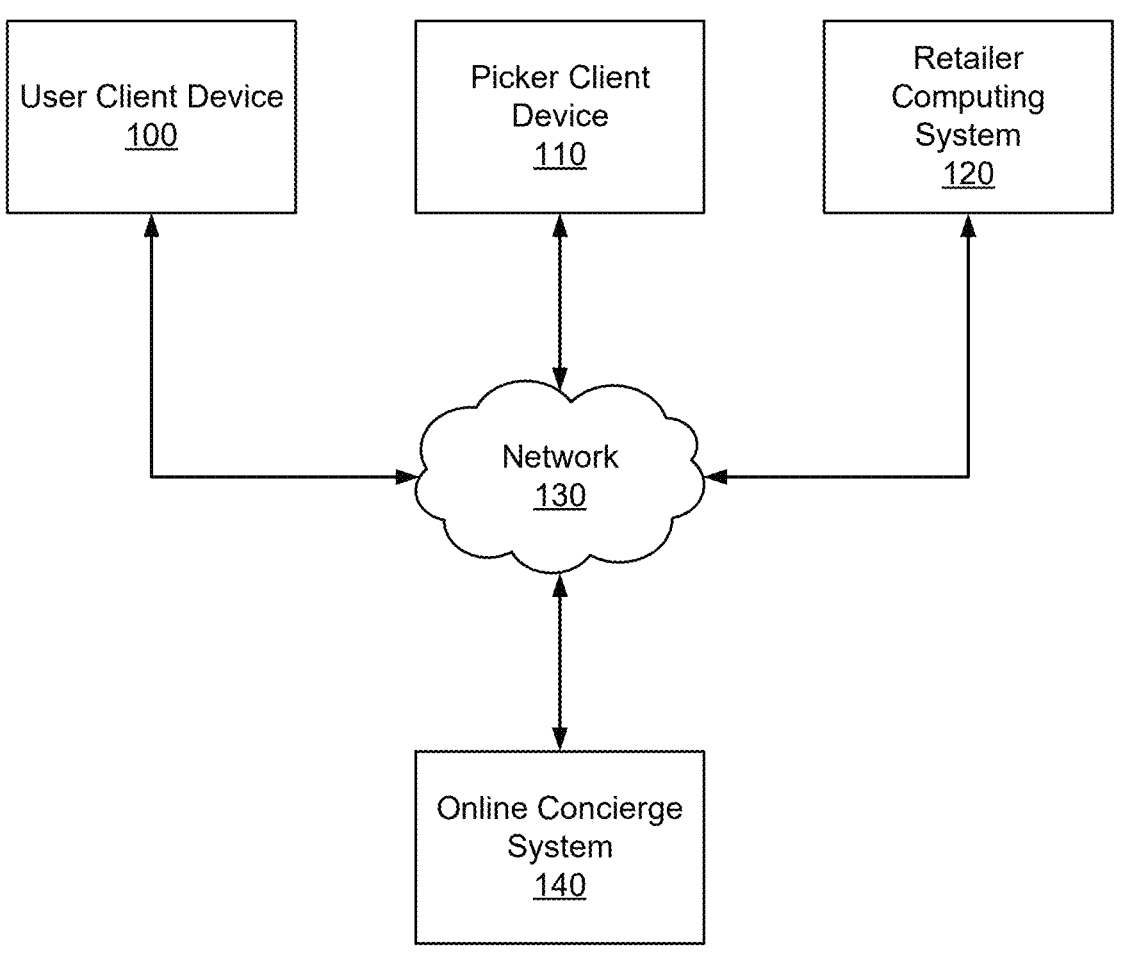
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 presents items from a catalog of items to a user of the online concierge system 140 in a user interface of the user client device 100 in which the items are scored, ranked (e.g., by a trained model) and placed in the user interface according to their ranking. The items presented at the user interface may be sponsored (e.g., advertised) by a third party (e.g., retailer associated with the online concierge system 140), where the score for a sponsored item may include an organic component and a bid component. To incentivize users to engage with a sponsored item displayed at the user interface of the user client device 100, the online concierge system 140 shares a revenue associated with the sponsored item in the form of, e.g., a discount provided to the user who purchases the sponsored item. However, it should be noted that the online concierge system 140 does not share a revenue for each sponsored item, but only for those sponsored items where a cost of providing an incentive is justified by a predicted lift in the user's conversion. To determine whether and how much the incentive should be to increase a likelihood of the user's conversion beyond a predetermined threshold, the online concierge system 140 uses an engagement prediction model (e.g., machine-learning model) to predict engagement likelihoods for an array of incentive amounts and then identifies an optimal incentive based on the predicted engagement likelihoods. Finally, the online concierge system 140 ranks the sponsored items in view of their optimal incentives and generates the user interface of the user client device 100 with the sponsored items rearranged according to the ranking.

The online concierge system 140 presented herein solves user affordability perception on certain content (e.g., sponsored items) and also drives an increased spending of a budget dedicated to this sponsored content. The presented method of the online concierge system 140 involves sharing bid margins of sponsored items with users through real time generated incentives. An incentive amount may be transferred to a user if the user engages with a sponsored item and/or purchases the sponsored item. The incentives, both amount and type, may be generated in real time as the user is searching through an application of the online concierge system 140 to build their shopping cart.

The online concierge system 140 with the integrated trained model may predict and select the right incentive experience (e.g., amount and/or type) for improved user engagement at the user interface of the user client device 100. Some examples of the incentives are credits or gift cards for future orders, direct order discount, direct credits/cashback. Users would thus earn credits, discount, cashback, etc. by engaging with (e.g., purchasing) sponsored items, which can influence user preference toward these items. Offered incentives provide flexibility in selection of sponsored items, discount eligibility, and encourage purchases in specific item categories. Different incentives would have different impacts on the user's engagement. The online concierge system 140 as presented herein can identify the right incentive experience for a given user and a sponsored item using the trained model which optimizes user's engagement at the user interface of the user client device 100. The online concierge system 140 is described in further detail below with regards to FIG. 2.

Figure 2:
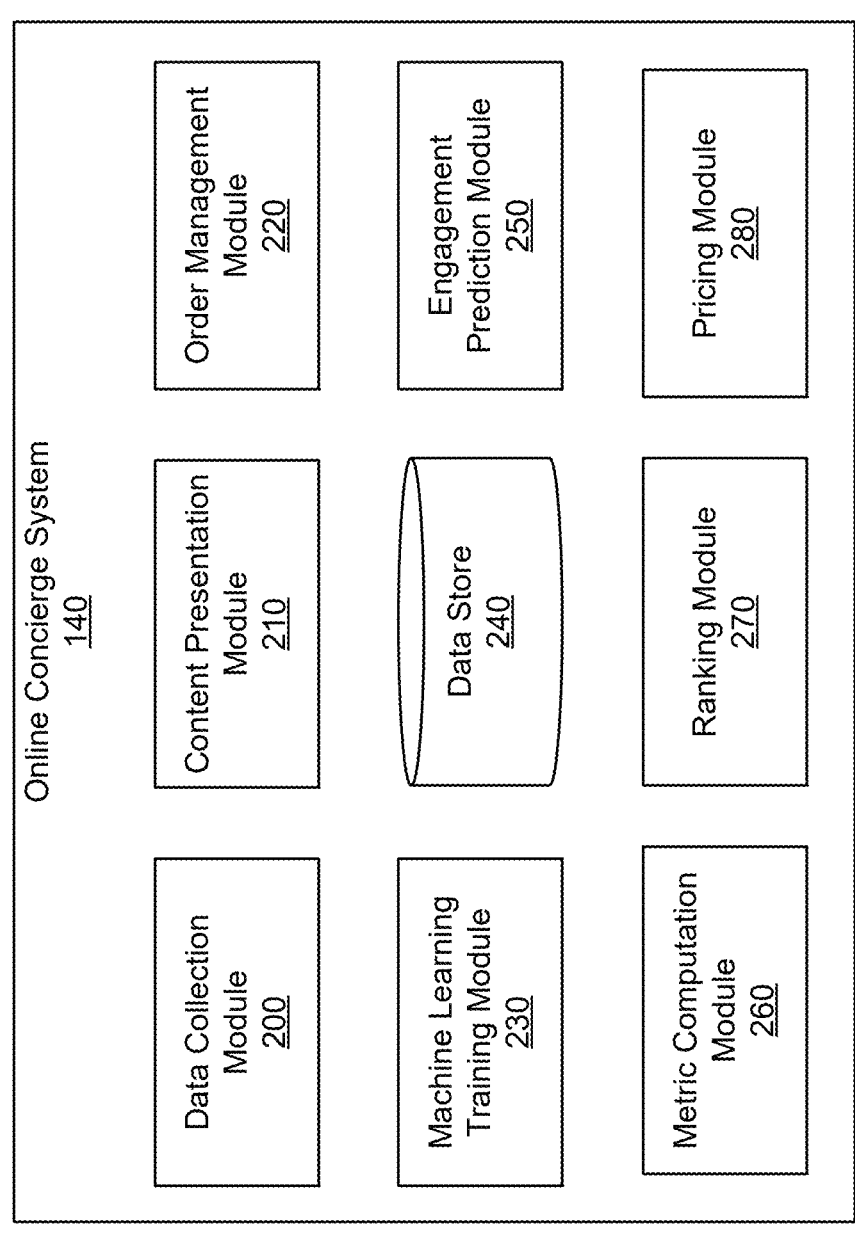
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, an engagement prediction module 250, a metric computation module 260, a ranking module 270, and a pricing module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The engagement prediction module 250 may identify an incentive amount that maximizes a cost metric associated with a specific element (e.g., sponsored item) displayed at a user interface of the user client device 100. Note that a sponsored item displayed at the user interface of the user client device 100 can be referred to herein as a "user interface element." The engagement prediction module 250 may access an engagement prediction model (e.g., machine-learning model) that is trained to predict a likelihood of engagement by a user of the online concierge system 140 with a user interface element when displayed at the user interface of the user client device 100. The engagement prediction module 250 may deploy the engagement prediction model to run a machine-learning algorithm to output, based on a set of inputs, the likelihood of user's engagement as a value between, e.g., 0 and 1. Before applying the engagement prediction model, the engagement prediction module 250 may filter out certain user interface elements, such as previously purchased sponsored items, sponsored items already included in a shopping cart, etc. A set of parameters for the engagement prediction model may be stored at one or more non-transitory computer-readable media of the engagement prediction module 250. Alternatively, the set of parameters for the engagement prediction model may be stored at one or more non-transitory computer-readable media of the data store 240.

In providing the set of inputs to the engagement prediction model, the engagement prediction module 250 may provide an incentive amount, a type of incentive (e.g., cash discount, coupon, points, etc.), user embeddings, item feature embeddings, search query embeddings, one or more non-sponsored items present in placement embeddings, cart items embeddings, item embeddings for items viewed/clicked on during a current ordering session, etc. The engagement prediction module 250 may retrieve some of the inputs for the engagement prediction model from, e.g., the data store 240. Alternatively or additionally, the engagement prediction module 250 may receive some of the inputs for the engagement prediction model from the user client device 100 via the network 130 as these inputs originate from user's interactions with an application of the online concierge system 140 running on the user client device 100.

In one or more embodiments, the engagement prediction model is implemented as a deep neural network model that is trained to predict a likelihood of user's engagement with a displayed user interface element. In particular, the engagement prediction model may be the predicted click-through rate (pCTR) model that is trained to predict a user's click-through rate (CTR) in relation to the displayed user interface element. If a predicted likelihood of user's engagement with a user interface element for a particular incentive amount is high enough and thus yielding an increased eCPM (effective cost per thousand impressions) in comparison with a predicted likelihood of user's engagement with the user interface element when no incentive is offered, then the dynamic incentive can be applied to the user interface element. The amount of the incentive may be also dependent on the engagement performance increase as predicted by the engagement prediction model.

In one or more embodiments, the engagement prediction model facilitates prediction of an optimal incentive amount for each user interface element. To predict the optimal incentive amount for each user interface element, the engagement prediction module 250 may apply the engagement prediction model multiple times with varying amounts of incentive (e.g., without the incentive, 10% of original revenue, 20% of original revenue, etc.) to predict likelihoods of user's engagement with a user interface element (e.g., pCTRs) for an array of incentive amounts.

After that, the metric computation module 260 may identify the optimal incentive amount as an incentive amount that maximizes a cost metric associated with the user interface element. The metric computation module 260 may compute the cost metric as, e.g., $$pCTR * (\text{maximum\_bid\_amount} - \text{incentive\_amount}), \qquad (1)$$

where the value of pCTR in equation (1) may be predicted by the engagement prediction model for a given value of "incentive_amount" in equation (1) of the array of incentive amounts, and "maximum_bid_amount" represents an original revenue of the online concierge system 140 for the user's engagement with the user interface element.

Additionally, once the optimal incentive amount is identified, the engagement prediction module 250 may apply the engagement prediction model multiple times using different types of incentive, such as, direct discount, fee discount, credit back, points, coupon, etc. to predict likelihoods of user's engagement with the user interface element (e.g., pCTR) when different types of incentive are offered to the user. The metric computation module 260 may then identify the optimal type of incentive as an incentive type that maximizes a likelihood of user's engagement with the user interface element when offered the optimal incentive amount in the form of a particular type of incentive. The engagement prediction model along with the metric computation module 260 may help decide whether to give users an additional incentive for a user interface element, as well as what type of incentive. The main goal of the engagement prediction model is to determine whether to attach any incentive to the displayed user interface element. In this manner, the online concierge system 140 ensures that incentives are not given on content that the user would have engaged with already, which would result in a wastage of incentive funds.

The ranking module 270 may rank user interface elements to determine their order when being displayed at a user interface of the user client device 100. As some or all of the user interface elements may be sponsored by one or more third parties (e.g., one or more retailers), their ranking may be affected by incentives identified by the engagement prediction model and the metric computation module 260. The ranking module 270 may thus re-rank those user interface elements that are sponsored by the one or more third parties based on modified revenues of the online concierge system 140. For each sponsored user interface element, a modified revenue is obtained by decreasing an original revenue by an optimal incentive amount.

At an initial stage of a system flow, a user of the online concierge system 140 may request a page of user interface elements, e.g., in response to a search query entered at a search interface of an application of the online concierge system 140 running on the user client device 100, or by browsing the application on any page (e.g., storefront page, browse page, etc.). For any grid/carousel of user interface elements, the content presentation module 210 may send a request to a catalog of sponsored content (e.g., as stored at the data store 240) to retrieve user interface elements (e.g., sponsored items). For each retrieved user interface element, the content presentation module 210 may annotate whether that user interface element is eligible for additional incentive as identified by the engagement prediction model and the metric computation module 260. The incentives applied to the user interface elements can be of various types, such as direct discounts, fee discounts, credits, points, coupons, etc. Before applying the engagement prediction model, the engagement prediction module 250 may filter some of the retrieved content, such as those items the user has bought before, brands the user has bought before, etc.

The engagement prediction module 250 may apply the engagement prediction model multiple times in order to identify an optimal incentive amount for a specific user interface element. The engagement prediction model may output an updated predicted engagement score (e.g., pCTR with incentive) assuming a specific incentive amount would be offered for engagement with the user interface element. The predicted engagement score may be indicative of a likelihood of user's engagement with the user interface element (e.g., conversion of the corresponding product or viewing/clicking on the user interface element). If the metric computation module 260 identifies that a difference between the predicted engagement score without any incentive amount (e.g., pCTR without incentive) and the updated predicted engagement score with the specific incentive (e.g., pCTR with incentive) is not greater than a tunable threshold value, then the metric computation module 260 may disqualify such content from getting an incentive.

The engagement prediction module 250 may apply the engagement prediction model multiple times with different incentive values for a single user interface element in order to understand how the user's engagement changes as the incentive amount changes. For example, when applying the engagement prediction model, the incentive amount may vary within the range between 0 and y*maximum_bid_amount, where y is a tunable parameter less than 1. The metric computation module 260 may then identify an optimal incentive amount for a specific user interface element as an incentive amount that maximizes a cost metric associated with the user interface element. In one or more embodiments, the cost metric may be an eCPM (estimated cost per 1000 impressions). The metric computation module 260 may calculate the eCPM for the user interface element displayed at the user interface of the user client device 100 as, e.g., $$pCTR*(\text{maximum\_bid\_value}-\text{incentive\_value})*1000. \quad (2)$$

After an optimal incentive amount is identified for each user interface element, the online concierge system 140 may run (e.g., via the ranking module 270 and the pricing module 280) a new modified auction for ranking and pricing of each user interface element.

During the ranking phase, the ranking module 270 may rank each user interface element for displaying at the user interface of the user client device 100. For each user interface element that has an attached incentive, the metric computation module 260 may recompute an adjusted revenue of the online concierge system 140 as, $$\text{adjusted\_revenue} = \text{maximum\_bid\_value}-\text{incentive\_amount}, \quad (3)$$

and an updated value of pCTR is set to pCTR_with_incentive. For each user interface element that does not have any incentive attached, a revenue of the online concierge system 140 (e.g., maximum_bid_value) and pCTR are not adjusted. The metric computation module 260 may then calculate the cost metric of each user interface element with applied incentives as pCTR_with_incentive*maximum_bid_adjusted, and as pCTR*maximum_bid for each user interface element without an applied incentive. The ranking module 270 may then rank each user interface element based on the calculated cost metric such as the highest ranked user interface element is the one with the highest metric, the second highest ranked user interface element is the one with the second highest metric, and so on.

During the pricing phase, the pricing module 280 may determine a price to be attached to each re-ranked user interface element for displaying at a user interface of the user client device 100. For example, a user interface element i is a user interface element with an incentive amount which is also the highest ranked user interface element, and a user interface element j is a user interface element without an incentive amount which is the second highest ranked user interface element. The user interface element j can be used to calculate a cost-per-click (CPC) of the user interface element i using the following. As the user interface element i is the highest ranked user interface element, it holds that:

$$eCPM_i > eCPM_j, \quad (4)$$

$$pCTR_{i\,with\,incentive}*MaxBid_{adjusted\,i} > pCTR_j*MaxBid_j, \quad (5)$$

$$pCTR_{i\,with\,incentive}*(MaxBid_i-IncentiveAmount_i) > \quad (6)$$

$$pCTR_j*MaxBid_j, \text{ and}$$

$$pCTR_{i\,with\,incentive}*(CPC_i-IncentiveAmount_i) = pCTR_j*MaxBid_j. \quad (7)$$

The pricing module 280 may thus calculate the CPC for the user interface element i as:

$$CPC_i = (pCTR_j * MaxBid_j)/(pCTR_{i\,with\,incentive}) + IncentiveAmount_i. \quad (8)$$

Finally, the pricing module 280 may calculate the price for the user interface element i based on the CPC calculated according to equation (8).

The content presentation module 210 may receive, from the ranking module 270, ranking information for each user interface element. Additionally, the content presentation module 210 may receive, from the pricing module 280, pricing information for each user interface element. Furthermore, the content presentation module 210 may receive, from the metric computation module 260, an identified optimal incentive amount (if any) for each user interface element. The content presentation module 210 may use the ranking information to cause the user client device 100 to display a user interface with ranked user interface elements, such that the highest ranked user interface element is displayed at the top of the user interface, the second ranked user interface element is displayed immediately below the highest ranked user interface element, and so on. Additionally, the content presentation module 210 may use the pricing information to cause the user client device 100 to display the user interface further with a corresponding price attached to each user interface element. Also, the content presentation module 210 may cause the user client device 100 to display the user interface further with the optimal incentive amount attached to each user interface element. If the optimal incentive amount for a specific user interface element is actually zero incentive, no incentive would be displayed along with that specific user interface element. As the incentive can be of different types, the content presentation module 210 may cause the user client device 100 to display the user interface with a particular type of incentive next to the user interface element, such as discount/credit, price reduction, coupon, etc.

As the user utilizes the user interface of the user client device 100 to add products associated with the user interface elements to a shopping cart, information about content added to the shopping cart may be stored at the data store 240. The content presentation module 210 may then cause the user client device 100 to display a user interface (e.g., checkout page and/or cart page) with a final credit back amount. The credit may be delivered to the user after a delivery of ordered items has been completed.

The machine-learning training module 230 may perform initial training of the engagement prediction model. The training may follow standard maximum-likelihood gradient descent of a loss function, such as the cross-entropy loss. The machine-learning training module 230 may train the engagement prediction model using training data to generate initial values for the set of parameters of the engagement prediction model. To generate training data, the machine-learning training module 230 may collect exploration data by selecting, uniformly and at random, certain content (e.g., sponsored items) that would get incentives. Furthermore, an amount of each incentive may be also selected in a uniformly random manner to learn how different incentive amounts influence user's engagement. The machine-learning training module 230 may train the engagement prediction model to predict whether any incentive should be given for engagement with specific content (e.g., sponsored item) for each page of an application of the online concierge system 140 running on the user client device 100 (e.g., search page, storefront page, aisles page, etc.). During training, different incentive amounts may be utilized for new users, churned users, and users with long tenures with the online concierge system 140 to evaluate the impacts on spend sponsored budget, total sales, and various metrics, such as order volume, gross transaction value (GTV), retention of users, etc.

The machine-learning training module 230 may collect user engagement data that are recorded when users engage with specific content (e.g., sponsored items) displayed at a user interface of the user client device 100, such as when the users purchase the sponsored items and/or click or view on the sponsored items. The machine-learning training module 230 may then re-train the engagement prediction model by updating the set of parameters of the engagement prediction model using the collected user engagement data. The machine-learning training module 230 may re-train the engagement prediction model on a continuous basis with fresh data over a specific time period (e.g., last N weeks) in order to learn new item behavior, learn new user behavior, and/or solve for distribution shifts.

Figure 3:
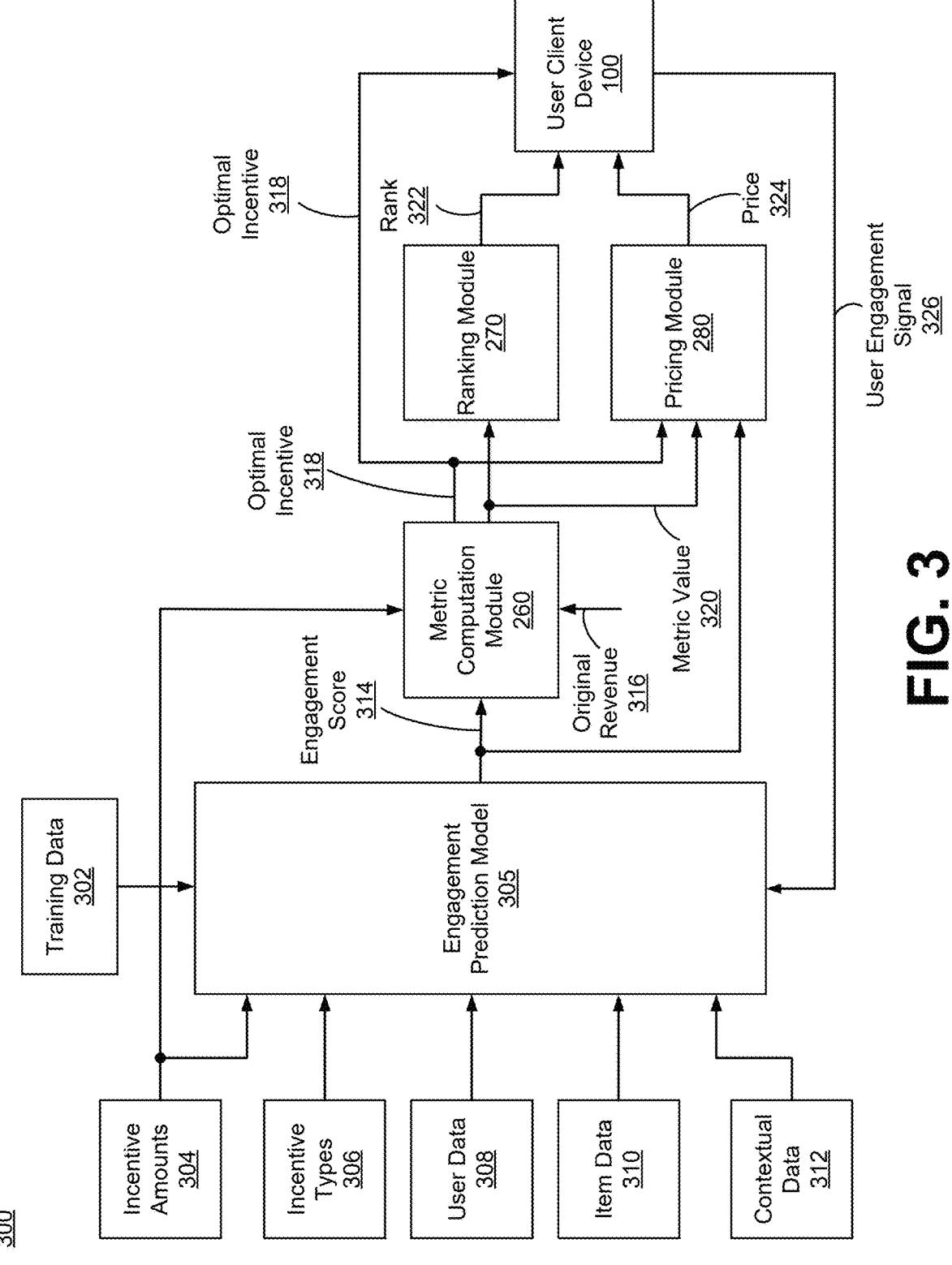
FIG. 3 illustrates an example architectural flow diagram of using a trained model of an online concierge system to display elements of a user interface of a device associated with a user of the online concierge system in a manner that facilitates user's engagement with the user interface elements, in accordance with one or more embodiments.

FIG. 3 illustrates an example architectural flow diagram 300 of using an engagement prediction model 305 to display elements of a user interface of the user client device 100 in a manner that facilitates user's engagement with the user interface elements, in accordance with one or more embodiments. First, the online concierge system 140 may perform (e.g., via the machine-learning training module 230) initial training of the engagement prediction model 305 using training data 302 to generate initial values for the set of parameters of the engagement prediction model 305. The training data 302 may be collected (e.g., via the machine-learning training module 230) by mapping, uniformly and at random, each item from a collection of items to a randomly selected incentive (e.g., incentive amount and/or incentive type) and recording how different incentives applied to different items influence engagements from a group of users of the online concierge system 140. After the training process is completed, the online concierge system 140 may provide various inputs to the engagement prediction model 305 (e.g., via the engagement prediction module 250), such as incentive amounts 304, incentive types 306, user data 308, item data 310, and/or contextual data 312. Some additional input features not shown in FIG. 3 suitable for predicting the user's engagements with content displayed at a user interface of the user client device 100 may be further provided to the engagement prediction model 305.

In providing the incentive amounts 304 to the engagement prediction model 305, the online concierge system 140 may provide (e.g., via the engagement prediction module 250) an array of incentive amounts where the engagement prediction model 305 is run for each incentive amount in the array, including zero incentive amount. The engagement prediction module 250 may retrieve the incentive amounts 304 from, e.g., a look-up table stored at the data store 240.

In providing the incentive types 306 to the engagement prediction model 305, the online concierge system 140 may provide (e.g., via the engagement prediction module 250) different labels of different types of incentives, such as direct discount, fee discount, credit back, points, coupon, etc. In one or more embodiments, the engagement prediction model 305 is run for each possible combination of an incentive amount and an incentive type. In one or more other embodiments, the engagement prediction model 305 is run for each incentive type of the incentive types 306 but only for an optimal incentive amount determined as part of an optimal incentive 318. The engagement prediction module 250 may retrieve different labels for different types of the incentive types 306 from, e.g., a look-up table stored at the data store 240.

In providing the user data 308 to the engagement prediction model 305, the online concierge system 140 may provide (e.g., via the engagement prediction module 250) information about purchasing preferences of the user, information about historical purchases by the user, an average budget the user spent over a defined time period, some other user-related information, or combination thereof. The engagement prediction module 250 may retrieve the user data 308 from the data store 240.

In providing the item data 310 to the engagement prediction model 305, the online concierge system 140 may provide (e.g., via the engagement prediction module 250) information about user interface elements (e.g., sponsored items) retrieved from the data store 240 in response to a user's request for a page of user interface elements at a user interface of the user client device 100 or in response to a search query entered by the user via a search interface of the user client device 100. Additionally, the item data 310 may include features of items already included in a user's shopping cart, features of items that the user viewed or clicked on during a current ordering session, some other item features, or some combination thereof. The engagement prediction module 250 may retrieve the item features within the item data 310 from a collection of items stored at the data store 240.

In providing the contextual data 312 to the engagement prediction model 305, the online concierge system 140 may provide (e.g., via the engagement prediction module 250) information about the search query entered by the user via the search interface of the user client device 100 including a user's intent in relation to the search query, information about a user's intent when requesting for a page of user interface elements at the user interface of the user client device 100, some other contextual information in relation to the current ordering session of the user, or some combination thereof. The engagement prediction module 250 may receive the contextual data 312 from the user client device 100 via the network 130.

The engagement prediction model 305 may apply a machine-learning algorithm to each incentive amount of the incentive amounts 304, one or more incentive types 306, the user data 308, the item data 310, and/or the contextual data 312 to output an engagement score 314 for each retrieved user interface element and for each incentive amount of the incentive amounts 304. The engagement score 314 (e.g., value between 0 and 1) may be indicative of a likelihood of user's engagement with a user interface element (viewing and/or conversion) when a corresponding incentive amount is offered to the user for engagement. A higher value of the engagement score 314 may be indicative of a higher likelihood of user's engagement, and vice versa. The engagement score 314 for each retrieved user interface element and for each incentive amount of the incentive amounts 304 output by the engagement prediction model 305 may be passed to the metric computation module 260.

The metric computation module 260 may calculate a cost metric (e.g., eCPM, as computed in accordance with equation (2)) for each retrieved user interface element based on the engagement score 314, a corresponding incentive amount of the incentive amounts 304 associated with the engagement score 314, and an original revenue 316 for conversion of a product associated with that user interface element. The metric computation module 260 may then identify an amount of the optimal incentive 318 for each user interface element as an incentive amount that maximize the cost metric. The metric computation module 260 may further identify a type of the optimal incentive 318 for each user interface element as an incentive type that maximizes the engagement score 314. The metric computation module 260 may further calculate a metric value 320 for each user interface element as a difference between the original revenue 316 and the amount of the optimal incentive 318, e.g., in accordance with equation (3). The amount of the optimal incentive 318 along with the metric value 320 and the engagement score 314 associated with the optimal incentive 318 may be passed to the pricing module 280. Information about the amount and type of the optimal incentive 318 may be passed to the user client device 100.

The ranking module 270 may determine a rank 322 for each retrieved user interface element based on the metric value 320. The ranking module 270 may pass the rank 322 for each user interface element to the user client device 100. The pricing module 280 may calculate a price 324 for each user interface element based on the amount of optimal incentive 318, the metric value 320 and the engagement score 314 associated with the optimal incentive 318. The pricing module 280 may pass the price 324 for each user interface element to the user client device 100.

Figure 4:
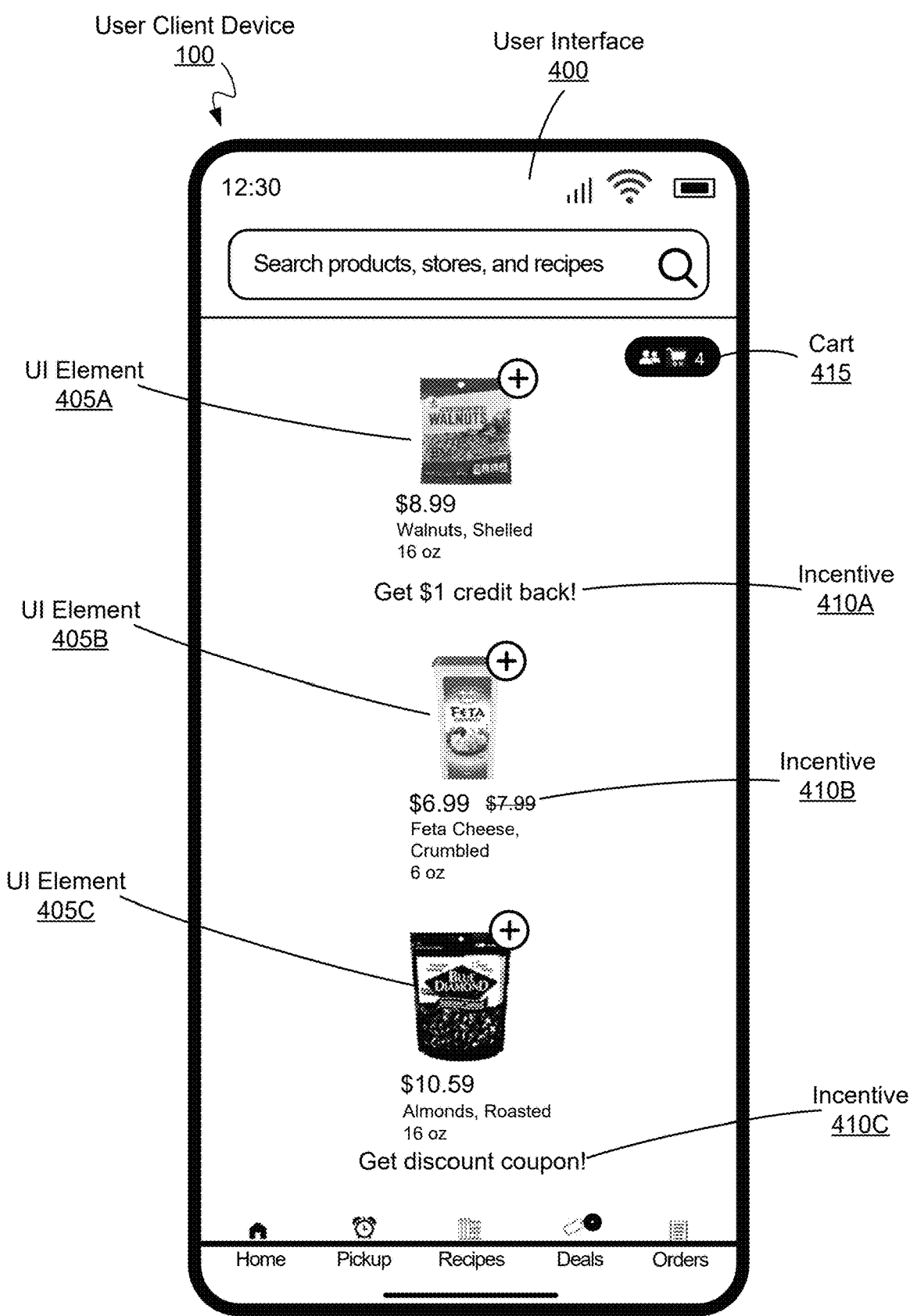
FIG. 4 illustrates an example user interface of a device associated with a user of an online concierge system with user interface elements displayed in a manner that facilitates user's engagement with the user interface elements, in accordance with one or more embodiments.

The user client device 100 may display the user interface with a list of user interface elements each ranked in accordance with the rank 322. For example, a user interface element with the highest rank 322 may be displayed at a top of the user interface, a user interface element with the second highest rank 322 may be displayed immediately below the highest ranked user interface element, and so on. A user interface element with a lowest rank 322 may be displayed at the user interface such that the user needs to scroll down the user interface in order to engage with the lowest ranked user interface element. The user client device 100 may display the user interface with the optimal incentive 318 (e.g., amount and type) shown adjacent to each user interface element (e.g., as shown in FIG. 4), along with the price 324 identified for each sponsored item. The user client device 100 may further generate a user engagement signal 326 with information about the user's engagement in relation to each user interface element displayed at the user interface of the user client device 100. The user engagement signal 326 may include information about conversion by the user in relation to one or more products associated with user interface elements and/or information about views (e.g., clicks) made by the user in relation to some of the user interface elements. The user engagement signal 326 may be recorded at the online concierge system 140 and utilized (e.g., via the machine-learning training module 230) to re-train the engagement prediction model 305. By utilizing the user engagement signal 326 generated by a collection of users via their user client devices 100, the machine-learning training module 230 may update the set of parameters of the engagement prediction model 305 and continuously improve the machine-learning algorithm of the engagement prediction model 305.

FIG. 4 illustrates an example user interface 400 of the user client device 400 with user interface (UI) elements (e.g., sponsored items) displayed in a manner that facilitates user's engagement with the UI elements, in accordance with one or more embodiments. The content presentation module 210 may cause the user client device 100 to display the user interface 400 during a user's ordering session, i.e., the user interface 400 may be an ordering session page. Alternatively, the content presentation module 210 may cause the user client device 100 to display the user interface 400 before a start of the user's ordering session or during the checkout. Hence, alternatively, the user interface 400 may be a storefront page or a checkout page.

The content presentation module 210 causes the user client device 100 to display an UI element 405A (e.g., sponsored item 405A) along with a corresponding incentive 410A (e.g., direct credit) at a top of the user interface 400. This is because a rank of the UI element 405A as determined by the ranking module 260 based in part on a likelihood of the user's engagement with the UI element 405A (e.g., clicking on the UI element 405A) is the highest among all UI elements displayed at the user interface 400. Additionally, the incentive 410A is determined to be an optimal incentive for the UI element 405A (e.g., in terms of an incentive amount and incentive type) as the incentive 410A maximizes a cost metric (e.g., eCPM) for the UI element 405A.

The content presentation module 210 further causes the user client device 100 to display an UI element 405B (e.g., sponsored item 405B) along with a corresponding incentive 410B (e.g., direct discount) at the user interface 400 below the UI element 405A. This is because a rank of the UI element 405B as determined by the ranking module 260 based in part on a likelihood of the user's engagement with the UI element 405B (e.g., clicking on the UI element 405B) is the second highest among all UI elements displayed at the user interface 400. Additionally, the incentive 410B is determined to be an optimal incentive for the UI element 405B (e.g., in terms of an incentive amount and incentive type) as the incentive 410B maximizes a cost metric (e.g., eCPM) for the UI element 405B.

The content presentation module 210 further causes the user client device 100 to display an UI element 405C (e.g., sponsored item 405C) along with a corresponding incentive 410C (e.g., discount coupon) at the user interface 400 below the UI element 405B. This is because a rank of the UI element 405C as determined by the ranking module 260 based in part on a likelihood of the user's engagement with the UI element 405C (e.g., clicking on the UI element 405C) is less than the rank of the UI element 405B. Additionally, the incentive 410C is determined to be an optimal incentive for the UI element 405C (e.g., in terms of an incentive amount and incentive type) as the incentive 410C maximizes a cost metric (e.g., eCPM) for the UI element 405C.

Additional UI elements (e.g., sponsored items) with corresponding incentives can be displayed at the user interface 400 below the UI element 405C (not shown in FIG. 4) as their ranks would be below the rank of the UI element 405C. In order to engage with any of the additional UI elements, the user would need to scroll down the user interface 400. This is mainly due to the fact that predicted likelihoods of user's engagement with any of the additional UI elements is lower than the predicted likelihood of user's engagement with the UI element 405C.

The user may utilize the user interface 400 to engage with any of the UI elements 405A, 405B, 405C. For example, the user may utilize the user interface 400 to add any of the UI elements 405A, 405B, 405C into a cart 415 for conversion of any products associated with the UI elements 405A, 405B, 405C. Alternatively, the user may utilize the user interface 400 to only view additional details (e.g., product ingredients) of the UI elements 405A, 405B, 405C without adding any of the UI elements 405A, 405B, 405C into the cart 415. Alternatively, the user may ignore the UI elements 405A, 405B, 405C and, e.g., proceed to the checkout without viewing or converting any of the UI elements 405A, 405B, 405C. The user's engagement with each of the UI elements 405A, 405B, 405C may be recorded as corresponding digital signals and stored at, e.g., the data store 240. The recorder digital signals with information about the user's engagement with each of the UI elements 405A, 405B, 405C may be used (e.g., via the machine-learning training module 230) for re-training of the engagement prediction model.

FIG. 5 is a flowchart for a method of using a trained model of an online concierge system to display elements of a user interface of a device associated with a user of the online concierge system in a manner that increases a likelihood of user's engagement, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., the online concierge system 140). Additionally, each of these steps may be performed automatically by the online concierge system without human intervention.

The online concierge system 140 receives 505 (e.g., at the data collection module 200 or the engagement prediction module 250), from a device associated with a user of the online concierge system 140 (e.g., the user client device 100) via a network (e.g., the network 130), a request from the user entered via a user interface of the device for a page of user interface elements to be displayed at the user interface. Responsive to the received request, the online concierge system 140 retrieves 510 (e.g., via the data collection module 200 or the engagement prediction module 250), from a database of the online concierge system 140 (e.g., the data store 240), a set of user interface elements to be displayed at the user interface. When retrieving the set of user interface elements from the database, the online concierge system 140 may filter out (e.g., via the engagement prediction module 250) one or more user interface elements retrieved from the database with which the user engaged in the past.

The online concierge system 140 accesses 515 an engagement prediction model of the online concierge system 140 (e.g., via the engagement prediction module 250), wherein the engagement prediction model is trained to predict, for each incentive amount of a plurality of incentive amounts, a likelihood of engagement by the user with each user interface element in the set of user interface elements when each incentive amount is offered to the user for engagement with each user interface element. The online concierge system 140 applies 520 the engagement prediction model (e.g., via the engagement prediction module 250) to predict, based at least in part on each incentive amount and user data associated with the user, the likelihood of engagement by the user with each user interface element for each incentive amount. The online concierge system 140 identifies 525 (e.g., via the metric computation module 260), based at least in part on the likelihood of engagement by the user with each user interface element for each incentive amount, an incentive amount of the plurality of incentive amounts for each user interface element. The online concierge system 140 may identify (e.g., via the metric computation module 260) the incentive amount that maximizes an estimated cost metric (e.g., eCPM) for each user interface element when displayed at the user interface along with the incentive amount.

The online concierge system 140 may apply the engagement prediction model (e.g., via the engagement prediction module 250) to predict the likelihood of engagement by the user with each user interface element when no incentive amount is offered to the user for engagement with each user interface element. The online concierge system 140 may then generate (e.g., via the metric computation module 260), for each user interface element, a difference between the predicted likelihood of engagement when no incentive amount is offered to the user and the predicted likelihood of engagement for each remaining incentive amount of the plurality of incentive amounts. The online concierge system 140 may label (e.g., via the content presentation module 210), based on the difference being less than a threshold value, that user interface element as being associated with no incentive amount for displaying at the user interface.

In one or more embodiments, the online concierge system 140 applies the engagement prediction model (e.g., via the engagement prediction module 250) to predict, based at least in part on the identified incentive amount and each type of incentive of a plurality of types, a likelihood of engagement by the user with each user interface element of the plurality of user interface elements when each type of incentive along with the identified incentive amount is offered to the user for engagement with each user interface element. The online concierge system 140 may then identify (e.g., via the metric computation module 260), based at least in part on the likelihood of engagement by the user with each user interface element for each type of incentive, a type of incentive of the plurality of types for each user interface element.

The online concierge system 140 generates 530 (e.g., via the metric computation module 260), based at least in part on the identified incentive amount, a metric for each user interface element. The metric may be indicative of the likelihood of engagement by the user with each user interface element for the identified incentive amount. The online concierge system 140 ranks 535 (e.g., via the ranking module 270), based on the metric for each user interface element and the predicted likelihood of engagement for the identified incentive amount, the set of user interface elements to identify a rank of each user interface element in the set of user interface elements.

The online concierge system 140 may generate (e.g., via the metric computation module 260), based on the identified incentive amount and an original revenue of the online concierge system 140 for engagement by the user with each user interface element, an adjusted revenue of the online concierge system 140 for engagement by the user with each user interface element. The online concierge system 140 may assign (e.g., via the ranking module 270) a highest rank to a user interface element in the set of user interface elements that is associated with a highest value of the adjusted revenue among adjusted revenues for the set of user interface elements. The online concierge system 140 may then label (e.g., via the ranking module 270) the user interface element with the highest rank for displaying at a top of the user interface.

The online concierge system 140 generates 540 (e.g., via the content presentation module 210), based on the ranking, the user interface that includes the set of user interface elements arranged according to the metric for each user interface element. Hence, the online concierge system 140 may generate (e.g., via the content presentation module 210) the user interface in a way that arranges the set of user interface elements according to a likelihood that the user will select (i.e., engage with) each user interface element of the set of user interface elements. The online concierge system 140 causes 545 (e.g., via the content presentation module 210) the device associated with the user to display the user interface with the set of user interface elements according to the identified rank of each user interface element, each user interface element displayed at the user interface along with the identified incentive amount. The online concierge system 140 may cause (e.g., via the content presentation module 210) the device associated with the user to display the user interface further with the identified type of incentive along with each user interface element and the identified incentive amount.

The online concierge system 140 may randomly assign (e.g., via the machine-learning training module 230) the plurality of incentive amounts to a group of user interface elements so that a randomly assigned incentive amount of the plurality of incentive amounts is offered to each user from a collection of users of the online concierge system 140 for engagement with a corresponding user interface element from the group. The online concierge system 140 may generate (e.g., via the machine-learning training module 230) training data by recording engagement by each user of the collection of users with the corresponding user interface element. The online concierge system 140 may train (e.g., via the machine-learning training module 230) the engagement prediction model using the training data to generate a set of initial values for the set of parameters of the engagement prediction model.

The online concierge system 140 may collect (e.g., via the machine-learning training module 230) feedback data with information about engagement by the user with the set of user interface elements displayed at the user interface according to the rank of each user interface element. The online concierge system 140 may re-train the engagement prediction model by updating (e.g., via the machine-learning training module 230), using the collected feedback data, the set of parameters of the engagement prediction model.

Embodiments of the present disclosure are directed to the online concierge system 140 that uses a trained model to display user interface elements at a user interface of the user client device 100 in a manner that makes it easier for the user to engage with the displayed user interface elements that access a functionality of a computer system. In this manner, as the user interface elements are displayed at the user interface based in part on the likelihood of user's engagement with them (e.g., likelihood of a user clicking on them), displaying of the user interface is improved. Those user interface elements that are more likely to be selected by the user for engagement are placed higher in the user interface so the user can access them with less scrolling. Additionally, enhanced user perception of the online concierge system 140 is achieved as the user interface of the user client device 100 is easier for use while providing more affordable online shopping choices.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   receiving, via a network and from a device associated with a user of an online system, a request from the user entered via a user interface of the device for a page of user interface elements to be displayed at the user interface;

responsive to the received request, retrieving, from a database of the online system, a set of user interface elements to be displayed at the user interface;

receiving, via the network and from the device associated with the user, contextual data for the user including information about an intent of the user when initiating the request for the page of user interface elements;

accessing an engagement prediction model, wherein the engagement prediction model is a machine-learning model trained to predict, for each incentive amount of a plurality of incentive amounts, a likelihood of engagement by the user with each user interface element in the set of user interface elements when each incentive amount is offered to the user for engagement with each user interface element;

applying the engagement prediction model to each incentive amount, user data associated with the user, and the contextual data to generate the likelihood of engagement by the user with each user interface element for each incentive amount;

identifying, based on the likelihood of engagement by the user with each user interface element for each incentive amount, an incentive amount of the plurality of incentive amounts for each user interface element;

generating, based on the identified incentive amount, a metric for each user interface element, wherein the metric is indicative of the likelihood of engagement by the user with each user interface element for the identified incentive amount;

ranking, based on the metric for each user interface element and the predicted likelihood of engagement for the identified incentive amount, the set of user interface elements to identify a rank of each user interface element in the set of user interface elements;

generating, based on the ranking, the user interface that includes the set of user interface elements arranged according to the metric for each user interface element; and causing the device associated with the user to display the user interface with the set of user interface elements according to the identified rank of each user interface element, each user interface element displayed at the user interface along with the identified incentive amount, wherein displaying the set of user interface elements comprises:
   displaying, at a top of the user interface, a first user interface element from the set of user interface elements that has a highest rank among the set of user interface elements,
   displaying, at the user interface immediately below the first user interface element, a second user interface element from the set of user interface elements that has a second highest rank among the set of user interface elements, and
   displaying, at a bottom of the user interface, a third user interface element from the set of user interface elements that has a lowest rank among the set of user interface elements.

2. The method of claim 1, wherein retrieving the set of user interface elements comprises:
   filtering out one or more user interface elements retrieved from the database with which the user previously engaged.

3. The method of claim 1, wherein applying the engagement prediction model comprises:

applying the engagement prediction model to predict the likelihood of engagement by the user with each user interface element when no incentive amount is offered to the user for engagement with each user interface element.

4. The method of claim 3, wherein identifying the incentive amount comprises:

generating, for each user interface element, a difference between the predicted likelihood of engagement when no incentive amount is offered to the user and the predicted likelihood of engagement for each remaining incentive amount of the plurality of incentive amounts; and labeling, based on the difference, that user interface element as being associated with no incentive amount for displaying at the user interface.

5. The method of claim 1, wherein identifying the incentive amount comprises:

identifying the incentive amount that maximizes an estimated cost metric for each user interface element when displayed at the user interface along with the incentive amount.

6. The method of claim 1, further comprising:

applying the engagement prediction model to predict, based on the identified incentive amount and each type of incentive of a plurality of types, a likelihood of engagement by the user with each user interface element of the plurality of user interface elements when each type of incentive along with the identified incentive amount is offered to the user for engagement with each user interface element; and identifying, based on the likelihood of engagement by the user with each user interface element for each type of incentive, a type of incentive of the plurality of types for each user interface element.

7. The method of claim 6, further comprising:

causing the device associated with the user to display the user interface further with the identified type of incentive along with each user interface element and the identified incentive amount.

8. The method of claim 1, wherein generating the metric comprises:

generating, based on the identified incentive amount and an original revenue of the online system for engagement by the user with each user interface element, an adjusted revenue of the online system for engagement by the user with each user interface element.

9. The method of claim 8, wherein ranking the set of user interface elements comprises:

assigning the highest rank to the first user interface element in the set of user interface elements that is associated with a highest value of the adjusted revenue among adjusted revenues for the set of user interface elements; and labeling the first user interface element with the highest rank for displaying at the top of the user interface.

10. The method of claim 1, further comprising:

randomly assigning the plurality of incentive amounts to a group of user interface elements so that a randomly assigned incentive amount of the plurality of incentive amounts is offered to each user from a collection of users of the online system for engagement with a corresponding user interface element from the group;

generating training data by recording engagement by each user of the collection of users with the corresponding user interface element; and training the engagement prediction model using the training data to generate a set of initial values for a set of parameters of the engagement prediction model.

11. The method of claim 1, further comprising:

collecting feedback data with information about engagement by the user with the set of user interface elements displayed at the user interface according to the rank of each user interface element; and re-training the engagement prediction model by updating, using the collected feedback data, a set of parameters of the engagement prediction model.

12. A computer program product comprising a non-transitory computer readable storage medium having instructions encoded thereon that, when executed by a processor, cause the processor to perform steps comprising:

receiving, via a network and from a device associated with a user of an online system, a request from the user entered via a user interface of the device for a page of user interface elements to be displayed at the user interface;

responsive to the received request, retrieving, from a database of the online system, a set of user interface elements to be displayed at the user interface;

receiving, via the network and from the device associated with the user, contextual data for the user including information about an intent of the user when initiating the request for the page of user interface elements;

accessing an engagement prediction model, wherein the engagement prediction model is a machine-learning model trained to predict, for each incentive amount of a plurality of incentive amounts, a likelihood of engagement by the user with each user interface element in the set of user interface elements when each incentive amount is offered to the user for engagement with each user interface element;

applying the engagement prediction model to each incentive amount, user data associated with the user, and the contextual data to generate the likelihood of engagement by the user with each user interface element for each incentive amount;

identifying, based on the likelihood of engagement by the user with each user interface element for each incentive amount, an incentive amount of the plurality of incentive amounts for each user interface element;

generating, based on the identified incentive amount, a metric for each user interface element, wherein the metric is indicative of the likelihood of engagement by the user with each user interface element for the identified incentive amount;

ranking, based on the metric for each user interface element and the predicted likelihood of engagement for the identified incentive amount, the set of user interface elements to identify a rank of each user interface element in the set of user interface elements;

generating, based on the ranking, the user interface that includes the set of user interface elements arranged according to the metric for each user interface element; and causing the device associated with the user to display the user interface with the set of user interface elements according to the identified rank of each user interface element, each user interface element displayed at the user interface along with the identified incentive amount, wherein displaying the set of user interface elements comprises:

displaying, at a top of the user interface, a first user interface element from the set of user interface elements that has a highest rank among the set of user interface elements, displaying, at the user interface immediately below the first user interface element, a second user interface element from the set of user interface elements that has a second highest rank among the set of user interface elements, and displaying, at a bottom of the user interface, a third user interface element from the set of user interface elements that has a lowest rank among the set of user interface elements.

13. The computer program product of claim 12, wherein the instructions further cause the processor to perform steps comprising:

applying the engagement prediction model to predict the likelihood of engagement by the user with each user interface element when no incentive amount is offered to the user for engagement with each user interface element;

generating, for each user interface element, a difference between the predicted likelihood of engagement when no incentive amount is offered to the user and the predicted likelihood of engagement for each remaining incentive amount of the plurality of incentive amounts; and labeling, based on the difference, that user interface element as being associated with no incentive amount for displaying at the user interface.

14. The computer program product of claim 12, wherein the instructions further cause the processor to perform steps comprising:

identifying the incentive amount that maximizes an estimated cost metric for each user interface element when displayed at the user interface along with the incentive amount.

15. The computer program product of claim 12, wherein the instructions further cause the processor to perform steps comprising:

applying the engagement prediction model to predict, based on the identified incentive amount and each type of incentive of a plurality of types, a likelihood of engagement by the user with each user interface element of the plurality of user interface elements when each type of incentive along with the identified incentive amount is offered to the user for engagement with each user interface element;

identifying, based on the likelihood of engagement by the user with each user interface element for each type of incentive, a type of incentive of the plurality of types for each user interface element; and causing the device associated with the user to display the user interface further with the identified type of incentive along with each user interface element and the identified incentive amount.

16. The computer program product of claim 12, wherein the instructions further cause the processor to perform steps comprising:

generating the metric by generating, based on the identified incentive amount and an original revenue of the online system for engagement by the user with each user interface element, an adjusted revenue of the online system for engagement by the user with each user interface element.

17. The computer program product of claim 16, wherein the instructions further cause the processor to perform steps comprising:

assigning the highest rank to the first user interface element in the set of user interface elements that is associated with a highest value of the adjusted revenue among adjusted revenues for the set of user interface elements; and labeling the first user interface element with the highest rank for displaying at the top of the user interface.

18. The computer program product of claim 12, wherein the instructions further cause the processor to perform steps comprising:

randomly assigning the plurality of incentive amounts to a group of user interface elements so that a randomly assigned incentive amount of the plurality of incentive amounts is offered to each user from a collection of users of the online system for engagement with a corresponding user interface element from the group;

generating training data by recording engagement by each user of the collection of users with the corresponding user interface element; and training the engagement prediction model using the training data to generate a set of initial values for a set of parameters of the engagement prediction model.

19. The computer program product of claim 12, wherein the instructions further cause the processor to perform steps comprising:

collecting feedback data with information about engagement by the user with the set of user interface elements displayed at the user interface according to the rank of each user interface element; and re-training the engagement prediction model by updating, using the collected feedback data, a set of parameters of the engagement prediction model.

20. A computer system comprising:

a processor; and a non-transitory computer-readable storage medium having instructions that, when executed by the processor, cause the computer system to perform steps comprising:

receiving, via a network and from a device associated with a user of an online system, a request from the user entered via a user interface of the device for a page of user interface elements to be displayed at the user interface;

responsive to the received request, retrieving, from a database of the online system, a set of user interface elements to be displayed at the user interface;

receiving, via the network and from the device associated with the user, contextual data for the user including information about an intent of the user when initiating the request for the page of user interface elements;

accessing an engagement prediction model, wherein the engagement prediction model is a machine-learning model trained to predict, for each incentive amount of a plurality of incentive amounts, a likelihood of engagement by the user with each user interface element in the set of user interface elements when each incentive amount is offered to the user for engagement with each user interface element;

applying the engagement prediction model to each incentive amount, user data associated with the user, and the contextual data to generate the likelihood of engagement by the user with each user interface element for each incentive amount;

identifying, based on the likelihood of engagement by the user with each user interface element for each incentive amount, an incentive amount of the plurality of incentive amounts for each user interface element;

generating, based on the identified incentive amount, a metric for each user interface element, wherein the metric is indicative of the likelihood of engagement by the user with each user interface element for the identified incentive amount;

ranking, based on the metric for each user interface element and the predicted likelihood of engagement for the identified incentive amount, the set of user interface elements to identify a rank of each user interface element in the set of user interface elements;

generating, based on the ranking, the user interface that includes the set of user interface elements arranged according to the metric for each user interface element; and causing the device associated with the user to display the user interface with the set of user interface elements according to the identified rank of each user interface element, each user interface element displayed at the user interface along with the identified incentive amount, wherein displaying the set of user interface elements comprises:

displaying, at a top of the user interface, a first user interface element from the set of user interface elements that has a highest rank among the set of user interface elements, displaying, at the user interface immediately below the first user interface element, a second user interface element from the set of user interface elements that has a second highest rank among the set of user interface elements, and displaying, at a bottom of the user interface, a third user interface element from the set of user interface elements that has a lowest rank among the set of user interface elements.

* * * * *